United States Patent Office 3,213,986
Patented Oct. 26, 1965

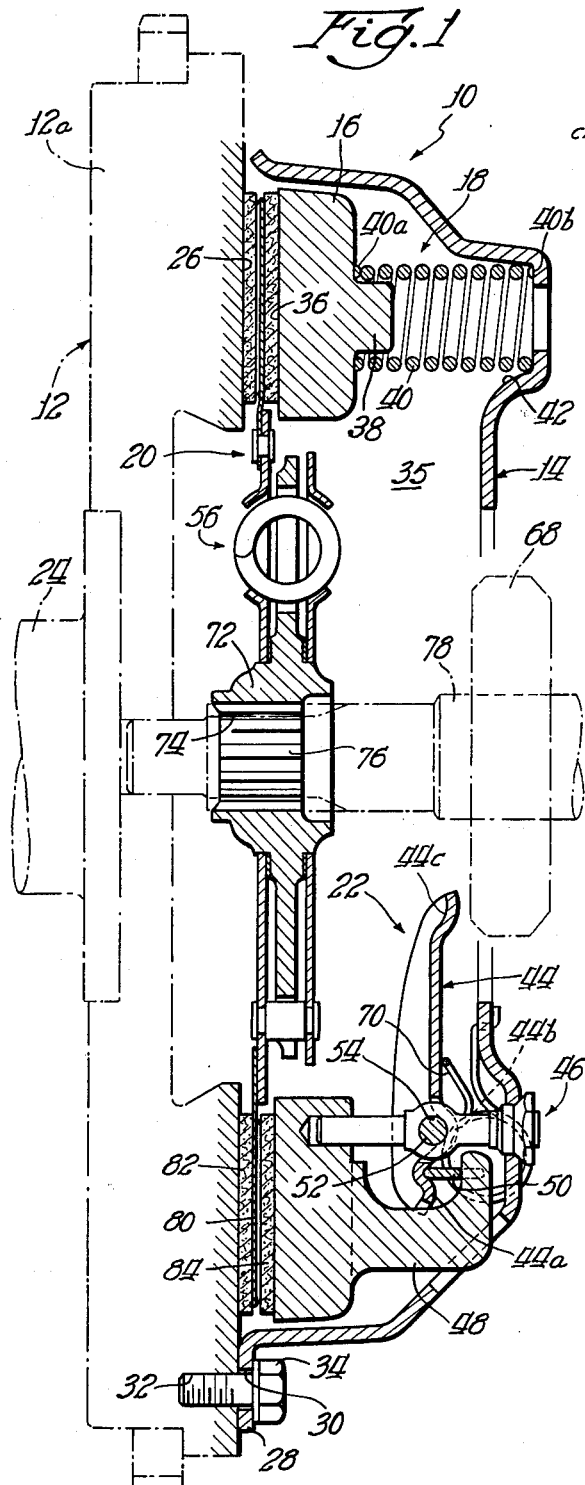

3,213,986
FRICTION DEVICE
Richard L. Smirl, La Grange Park, Ill., assignor to Borg-Warner Corporation, Chicago, Ill., a corporation of Illinois
Filed Dec. 29, 1961, Ser. No. 163,180
4 Claims. (Cl. 192—68)

This invention relates to clutch devices and more particularly to clutch devices of the friction disc type commonly employed in automobiles and similar vehicles.

Clutch devices of the friction disc type are used quite extensively in the clutch industry and a common example comprises a flywheel drivingly connected to the engine drive shaft and a pressure plate drivingly connected to the flywheel and normally spring urged for engagement with a driven plate assembly adapted to be clamped between the pressure plate and the flywheel. The driven disc assembly, for example, may comprise oppositely facing friction facings or rings adapted to respectively engage the pressure plate and flywheel engaging surfaces.

Heretofore friction facing materials utilized on opposite sides of the disc assembly have been generally of a similar coefficient of friction. Tests have shown that by using friction materials, both of similar coefficient of frictions, the pressure plate will heat up to a higher temperature than the flywheel principally because of the lower mass of the pressure plate which accordingly has a lower capacity for heat absorption. However, because friction facing material will wear more rapidly above a certain critical temperature, repeated engagements of the clutch with such facing construction will cause the temperature of the pressure plate and adjacent friction facing material to rise above the critical temperature and thereby promote wear on that side of the driven disc assembly. The other friction facing material adapted to contact the flywheel will usually not show signs of wear since the mass of the flywheel is normally great enough to maintain whatever heat generation there is at a low temperature level and below that which is critical.

To improve this condition, it has been suggested in the prior art that a greater wear-resistant facing or friction material be used on the driven disc assembly which engages the pressure plate. The purpose of this is to insert a more wear-resistant material in the position where the greatest wear occurs. However, wear-resistant materials also have a higher coefficient of friction; this results in more increased heat transferred to the pressure plate and thereby still higher temperatures achieved at the pressure plate face. The operating temperatures at the pressure plate face usually increase enough to out-distance the increased critical temperature of the new facing material at that location due to the more enhanced wear-resistant material. This again results in the evil which is to be obviated.

It is contemplated by this invention to provide a driven disc assembly which mounts friction facing materials of differential coeffcients of friction on opposite sides thereof and with the friction material of the highest coefficient of friction adapted to engage the flywheel. Accordingly, the friction facing material of the higher coefficient of friction will produce more heat on the flywheel side but since the flywheel has a much greater mass it will reflect a smaller increase in the operating temperature of the adjacent friction facing material. In contrast, the friction facing material engaging the pressure plate will have a lower operating temperature because it handles less torque; the decrease in temperature as compared with the conditions produced by prior art constructions will tend to equalize the operating temperatures of both friction facing materials so that they may rise with continued clutch engagements to a maximum temperature which is generally below that which is critical for the particular friction facing materials.

Therefore, it is a primary object of this invention to provide an improved clutch device which is more resistant to wear.

Another object of this invention is to provide a clutch device having a driven disc assembly carrying friction facing material adapted to cooperate with the device and tend toward equalizing the operating temperatures of the friction facings at opposite sides of the disc assembly.

Still another object of this invention is to provide a clutch device of the friction disc type and having resilient means for normally urging the clutch device into full engagement, the clutch device being provided with means for reducing the operating temperature of the friction facing material adjacent the pressure plate and thereby reduce the amount of heat generated and subsequently transferred in part to said resilient engaging means whereby destruction of resiliency due to heat is substantially retarded.

Yet another object of this invention is to provide a clutch device of the friction disc type and having a driven disc assembly carrying opposed friction facing materials, each facing being of a different coefficient of friction and having the friction facing material engageable with the flywheel of the highest coefficient of friction.

The other objects and features of this invention will be more readily apparent to those skilled in the art from the specification and appended drawings illustrating a certain preferred embodiment in which:

FIG. 1 is an elevational view of a clutch device partly in section and partly schematic and embodying the principles of this invention;

FIG. 2 is a graphical representation of the operating temperature of the friction facing materials plotted against the number of clutch engaging cycles, this graph illustrating the conditions resulting when the friction facing materials on opposite sides of the disc assembly are of generally equal coefficients of friction;

FIG. 3 is a graphical illustration like that in FIG. 2 and illustrating the conditions that result when the friction facing material adjacent the pressure plate is of the higher coefficient of friction; and FIG. 4 is a graphical illustration like that in FIG. 2, illustrating the conditions that result when the friction facing material adjacent the flywheel is of greater coefficient of friction and substantially in accordance with the present invention.

Referring now to the drawings and more particularly to FIG. 1, there is shown a clutch device of the friction disc type, generally indicated by the reference numeral 10 and comprising in its broadest aspects a flywheel 12, a cover plate 14 secured to the flywheel, a pressure plate 16 adapted to be urged by actuating means 18 for clamping a driven disc assembly 20 in cooperation with the flywheel for providing conjoint rotation, and a release means 22.

The flywheel 12 is of the flat face type having its inner periphery fastened to the end of an engine driven shaft 24 which together herein comprise a driving means for the clutch. The radially outermost annular portion 12a of the flywheel has a greater thickness to provide increased mass at its outer periphery, the outer portion carrying a generally flat annular surface 26 for purposes hereinafter described.

The cover plate 14 has a radially extending peripheral flange 28 provided with a plurality of circumferentially spaced openings 30 aligned with suitable threaded openings 32 provided in the adjacent portions of the flywheel and similarly circumferentially spaced. Fasteners 34 extend through said openings 30 and 32 for joining said cover plate to the flywheel for conjoint rotation.

Disposed within a chamber 35, defined by the cover plate and flywheel, is the pressure plate 16 generally axially aligned with the flywheel and carrying a flat annular surface 36 opposed to the flywheel surface 26. A plurality of bosses 38 extend axially outwardly from the pressure plate, to the right as shown in FIG. 1, and are adapted to journal one end 40a of a coiled compression spring 40, the plurality of circumferentially spaced springs 40 herein comprising the clutch engaging means 18. The opposite end 40b of each coiled compression spring is journaled in a recess 42 formed in the cover plate 14. The springs are adapted to cooperate in urging the pressure plate toward the flywheel for providing clutch engagement; the springs are in direct contact with the pressure plate and are subject to heat conduction afforded by such contact.

The clutch release means may be of the type disclosed in United States Patent 2,104,962 and generally comprises a plurality of levers 44 each adapted to pivot about an eye-bolt construction 46 mounted on the cover plate and journaled in the pressure plate, one end 44a of each of the levers being adapted to interconnect with integral extensions 48 of the pressure plate by way of a strut 50 for applying a disengaging force. An intermediate portion 44b of each lever is adapted to fulcrum about an axle member 52 pivotly received in central openings 54 provided in the eye-bolt construction 46.

The innermost end 44c of each of the levers is adapted to receive a clutch releasing force, here preferably shown to be applied by a collar 68 adapted to be moved to the left as seen in FIG. 1. Return springs 70 are mounted on the cover plate and adapted to urge the releasing levers into an operative position with the strut 50.

The driven disc assembly comprises a hub assembly 72 having a torsional vibration damper 56 having a central opening 74 provided with splines 76 for a driving connection with a driven shaft 78; the driven shaft and driven disc assembly together comprise a driven means for purposes of this invention. Fastened to the outer periphery of the hub assembly 72 is a plurality of flexible mounting plates 80. Friction facing elements in the form of annular rings 82 and 84 are fastened to opposite sides of the flexible plates 80 by suitable fasteners (not shown) and adapted to respectively engage the surface 26 of the flywheel and surface 36 of the pressure plate when engaging the clutch. The elements 82 and 84 are formed of friction material having a thermal insulating quality higher than the adjacent pressure plate or flywheel.

One feature of this invention is characterized by the friction facing element or ring 82, disposed on the left hand side of the driven disc assembly as shown in FIG. 1 and which is adapted to engage the flywheel, having material comprised of a higher coefficient of friction than the friction facing element or ring 84 disposed on the opposite side of the driven disc assembly. One advantage of this arrangement is the tendency of the opposed friction facing elements on opposite sides of the driven disc assembly to equalize operating temperatures during clutch operation. This necessarily results in a lower operating temperature for the pressure plate from that achieved by known construction and causes less wear of the friction facing material. In addition, the lower operating temperature of the pressure plate will also result in a lesser amount of heat that is transmitted to the clutch engaging springs 40 thereby obviating and reducing the tendency for these springs to wilt (or reduce their resilient qualities) with increased heat.

To more fully indicate the advance provided by this invention, FIG. 2 illustrates certain operating data in connection with a driven disc assembly having friction facings of generally equal coefficients of friction and which is the present standard of practice in the clutch industry at this time. Each friction facing will tend to do equal amounts of work since their coefficients of friction are about the same. However, the heat generated by the friction facing in contact with the flywheel will be absorbed by the greater mass of the flywheel and thereby not reach as high a temperature as that achieved by the pressure plate, which is of a lesser mass. Therefore, as the number of clutch engagements or cycles are increased, the temperature of the flywheel (see broken-line FIG. 2) will increase generally asymptotically to a line representing generally a temperature of 380° F. In contrast, the temperature of the pressure plate (see full line FIG. 2) will rise at a faster rate and will pass through a critical temperature of approximately 550° F. when the number of engagements have gone slightly beyond 300. When this critical temperature is reached, wear will occur at the friction facings adjacent the pressure plate and this enhanced heat will also be transferred to the coil springs eroding their resilient quantities.

FIG. 3 illustrates the temperature conditions that result when the friction facings adjacent the pressure plates are of a greater coefficient than the friction facings adjacent the flywheel. This approach, also suggested in the known art, will have the effect of aggravating the problem which is here attempted to be obviated. Referring to FIG. 3, it can be seen that the temperature curve for the flywheel rises to approach asymptotically a temperature maximum of approximately 310° F. However, the temperature curve of the pressure plate (see full line in FIG. 3) will rise at an even steeper rate than illustrated in FIG. 2 and will pass through the critical temperature of 550° F. at a much smaller number of clutch engagements, here shown to be approximately 225.

If the facing material with the higher coefficient of friction is placed on the flywheel side of the driven disc assembly, the operating temperature test data resulting will be in conformity with that shown in FIG. 4. Here it can be seen that the operating temperature curves for both the flywheel and pressure plate rise approximately at the same rate throughout the number of clutch engagements and approach asymptotically a maximum temperature of approximately 490° F. The heat will be dissipated in a manner whereby the operating temperatures of both facings or rings 82 and 84 will normally never rise above the critical temperature attributable to the particular friction facings.

It is not necessary that the temperatures of the friction facings be equalized; however, it is preferable for purposes of operation. A great improvement may still be realized if the friction facings have coefficients of friction chosen such that the operating temperature of the facing engageable with the pressure plate is brought down below the critical temperature of the facing material; this cannot be done by utilizing arrangements of the prior art.

While a certain preferred embodiment of the invention has been specifically disclosed, it is understood that the invention is not limited thereto, as many variations will be readily apparent to those skilled in the art and the invention is to be given its broadest possible interpretation within the terms of the following claims:

I claim:

1. A friction device, comprising: rotatable driving means; rotatable driven means carrying a pair of oppositely facing friction elements, each said friction element having an insulating character greater than said driving or driven means; pressure plate means drivingly connected to said driving means and cooperating with said driving means to frictionally clamp said driven means therebetween for conjoint rotation and having a lesser mass than said driving means; actuating means normally urging said pressure plate means toward said driven means for providing engagement; and release means adapted to selectively overcome the effect of said actuating means for disengaging said device, said device being particularly characterized in that the friction element adjacent said flywheel is of a higher coefficient of friction than the friction element adjacent said pressure plate and that during engagement a greater amount of torque will be imparted to said driven means by said driving means than by said pressure plate means.

2. A clutch device, comprising: driving means and driven means, said driven means carrying oppositely facing friction elements on opposite sides thereof, pressure plate means cooperating with said driving means to frictionally clamp said driven means therebetween for conjoint rotation, clutch actuating means normally urging said pressure plate means toward said driven means to provide clutch engagement, and clutch release means adapted to selectively overcome the effect of said actuating means for disengaging said clutch device, said clutch device being particularly characterized by means constituting at least a part of said friction elements and cooperating with said pressure plate means and driving means so that said driving means will take up a greater proportion of torque during the clutch engaging operation than the amount of torque taken up by the pressure plate due to friction, said last named means adapted so that the generation of heat due to friction between said driving means and driven means will be greater than the amount of heat generated between said last named means and said pressure plate means.

3. A friction device as in claim 1, in which said driving means comprises a flywheel having a generally flat annular surface, said pressure plate means carrying a flat annular surface in general alignment with said flywheel surface, said driven means comprising a central hub member having a plurality of flexible mounting segments secured to the outer periphery thereof and each mounting segment carrying at least one friction facing element on opposite sides thereof, the friction facing elements adjacent the flywheel being comprised of a higher coefficient of friction than the friction facing element adjacent the pressure plate so that the operating temperature of said friction facing element adjacent the pressure plate will not exceed its critical operating temperature whereby wear of said elements will be substantially reduced.

4. A friction device comprising: an annular rotatable driving flywheel; an annular pressure plate disposed in general axial alignment with said flywheel and having a lesser mass than the flywheel; a driven disc means interposed between said flywheel and pressure plate carrying one friction ring only on opposite sides thereof, one ring adapted to engage said flywheel and the other ring adapted to engage said pressure plate; resilient means normally urging said pressure plate toward said flywheel for clamping said driven disc means to provide conjoint rotation, said resilient means being in a substantially direct contact with said pressure plate whereby heat may readily be transferred by conduction therebetween; and release means adapted to selectively overcome the effect of said resilient means and disengage the device, said friction rings being particularly characterized in that said one ring adjacent said flywheel has a substantially greater coefficient of friction than said other ring whereby heat generated due to frictional interengagement of the rings with the flywheel and pressure plate will tend to equalize operating temperatures of both rings so as to maintain the temperatures below that which is critical and retard the loss of resiliency of said resilient means due to excessive heat transfer thereto.

References Cited by the Examiner
UNITED STATES PATENTS 2,104,962    1/38    Anderson    192—68
2,135,126    11/38    Harwood.
2,180,086    11/39    Kraft    192—131.1 XR DAVID J. WILLIAMOWSKY, *Primary Examiner.*

THOMAS J. HICKEY, *Examiner.*